D. CASSADAY.
SPRING SUSPENSION.
APPLICATION FILED JULY 31, 1915.

1,182,456. Patented May 9, 1916.

Witness:

INVENTOR
Daniel Cassaday
BY
Palzemond A. Parker
ATTORNEY

UNITED STATES PATENT OFFICE.

DANIEL CASSADAY, OF DETROIT, MICHIGAN.

SPRING SUSPENSION.

1,182,456.  Specification of Letters Patent.  Patented May 9, 1916.

Application filed July 31, 1915. Serial No. 42,904.

*To all whom it may concern:*

Be it known that I, DANIEL CASSADAY, a citizen of the United States, residing at Detroit, county of Wayne, State of Michigan, have invented a certain new and useful Improvement in Spring Suspension, and declare the following to be a full, clear, and exact description of the same, such as will enable others skilled in the art to which it pertains to make and use the same, reference being had to the accompanying drawings, which form a part of this specification.

My invention relates to spring suspension or support and consists in the special arrangement and combination of parts as hereinafter described and claimed.

Figure 1:
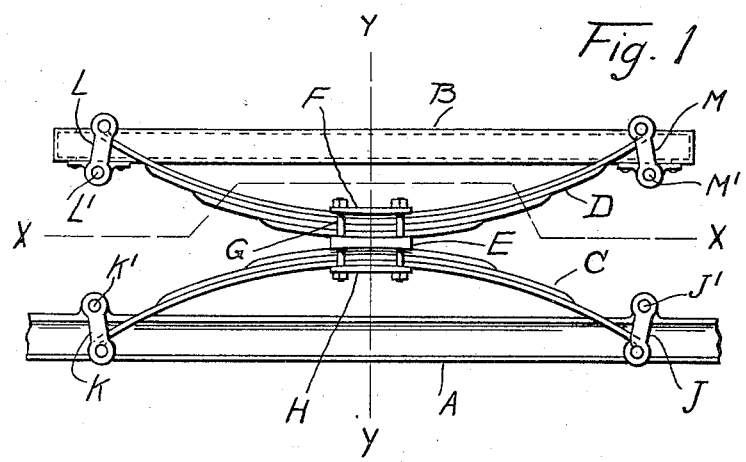
Figure 2:
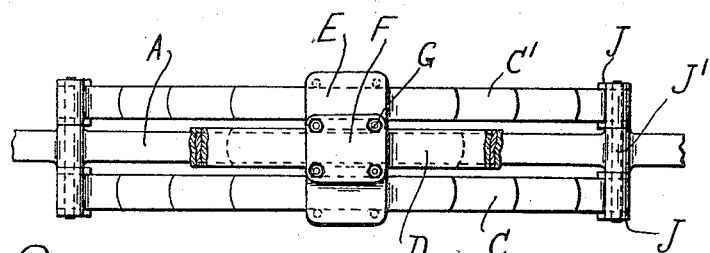
Figure 3:
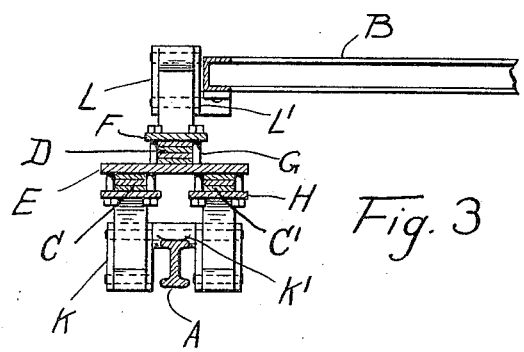

In the drawings,—Figure 1, is a vertical elevation of my spring suspension. Fig. 2, is a plan view on the line X—X of a part thereof, showing the relation of the three springs. Fig. 3, is a vertical cross-sectional view on the line Y—Y of Fig. 1.

In the specification, similar letters refer to similar parts.

In illustrating my invention, I have applied it to the end, front or rear, of a vehicle instead of to the side as might be applied if desired.

A, represents an axle of a vehicle with the ends broken away as those parts are unnecessary to illustrate or describe.

B, represents the front beam of the vehicle.

C, represents one of a pair of lower springs and in Fig. 2, C' represents the opposite of the pair of springs.

D, represents a single upper spring.

E, is a saddle connecting the two lower springs C, C' and supporting centrally the upper spring D.

A top plate F above the upper spring holds the parts in position by the clamping bolts G, G.

H, is a lower plate which extends across underneath both of the pair of springs C, C' and also forms a part of the clamping structure which holds the parts in position.

J, K, L, M represent suspension links pivoted at J', K', L', M' to the axle A and the supporting beam B. These links support the ends of the springs respectively and are journaled upon bolts passing through eyes in the axle A and also in the beam B. By this arrangement of supporting links, in combination with the two springs C and C' with the spring D upon supporting links in the manner shown, it is obvious that a swaying of the beam B to the right or left upon the links would cause the curvilinear action of each set of links, as that of J and M, K and L, to oppose one another so that as the end of the link J, in swaying, rose and fell by virtue of its quadrilateral action, a corresponding motion of the link M would compensate for the rising and falling, so that if the springs C, C' and D were rigid members, the frame B would move horizontally in the same plane without changing its distance from the axle A. The tilting of the frame B by side motion is therefore avoided to a large extent and to an entire extent so far as the links are concerned. The only tilting permissible is in the resiliency of the springs' action. By having two base springs, as C, C', coupled together and the superimposed spring, as D, I reduce the tendency, to some extent, of forward and backward movement of the body of which the frame B constitutes a part.

It is obvious that this form of spring suspension may be adopted upon either side of the rear portion of the body of an automobile, for instance, or vehicle, as well as acting as cross-springs for the front thereof, as shown, without departing from my invention.

The mode of operation is sufficiently obvious from the foregoing description.

What I claim is:

The combination of two parallel semi-elliptic springs arranged with their convexities upward, a semi-elliptical spring mounted thereon with its convexity downward, a central rigid inter-connection connecting the three springs, said lower pair of springs being mounted upon a base support, like an axle, by depending links, said upper spring being connected to a frame of a vehicle by depending links, substantially as described.

In testimony whereof, I sign this specification.

DANIEL CASSADAY.